US012609867B2

(12) United States Patent
Hisatsune et al.

(10) Patent No.: US 12,609,867 B2
(45) Date of Patent: Apr. 21, 2026

(54) SUPPORT SYSTEM AND DESIGN SUPPORT METHOD

(71) Applicant: Hitachi, Ltd., Tokyo (JP)

(72) Inventors: Taichi Hisatsune, Tokyo (JP);
Shinichiro Saito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 86 days.

(21) Appl. No.: 18/443,851

(22) Filed: Feb. 16, 2024

(65) Prior Publication Data

US 2024/0356809 A1     Oct. 24, 2024

(30) Foreign Application Priority Data

Apr. 20, 2023     (JP) ................................. 2023-069628

(51) Int. Cl.
| | |
|---|---|
| *G06F 15/177* | (2006.01) |
| *H04L 41/082* | (2022.01) |
| *H04L 41/0894* | (2022.01) |
| *H04L 41/0896* | (2022.01) |

(52) U.S. Cl.
CPC ........ *H04L 41/0894* (2022.05); *H04L 41/082* (2013.01); *H04L 41/0896* (2013.01)

(58) Field of Classification Search
CPC ............... H04L 41/0894; H04L 41/082; H04L 41/0896; H04L 41/085; H04L 41/5096; H04L 43/16; H04L 47/748; G06F 11/3495; G06F 9/50; G06F 8/60; G06F 11/3093; G06F 11/3447
See application file for complete search history.

(56) References Cited

U.S. PATENT DOCUMENTS

| | | | | |
|---|---|---|---|---|
| 8,255,529 B2 * | 8/2012 | Ferris | .................. | G06F 11/3495 |
| | | | | 709/224 |
| 8,739,157 B2 * | 5/2014 | Ho | ........................ | G06F 9/5077 |
| | | | | 718/1 |
| 9,208,184 B1 * | 12/2015 | Ukeda | ..................... | G06F 16/22 |
| 2014/0337750 A1 * | 11/2014 | Chang | ..................... | H04L 41/22 |
| | | | | 715/740 |
| 2018/0262413 A1 * | 9/2018 | Sureka | ................ | H04L 41/0896 |
| 2023/0120379 A1 * | 4/2023 | Nassar | ................ | H04L 41/5096 |
| | | | | 709/204 |
| 2024/0070321 A1 * | 2/2024 | Minarik | .............. | G06F 21/6245 |
| 2024/0163228 A1 * | 5/2024 | Fujita | ...................... | H04L 47/82 |
| 2025/0328442 A1 * | 10/2025 | Metimath | ........... | G06F 11/3409 |

FOREIGN PATENT DOCUMENTS

JP          2016-110325 A      6/2016

* cited by examiner

*Primary Examiner* — Suraj M Joshi
*Assistant Examiner* — Hao H Nguyen
(74) *Attorney, Agent, or Firm* — Volpe Koenig

(57)          ABSTRACT

A design support system that executes design support of an architecture of a cloud deployment system generates architecture candidates in the case of sharing of resources by new systems newly deployed on a cloud and operation systems which are operating on the cloud and architecture candidates in the case of non-sharing of the resources. For the architecture candidates in both the cases of sharing of the resources and non-sharing of the resources, architecture candidates meeting a non-function requirement of an operation system and a non-function requirement of a new system are determined as architectures deployed on the cloud.

17 Claims, 19 Drawing Sheets

FIG. 5

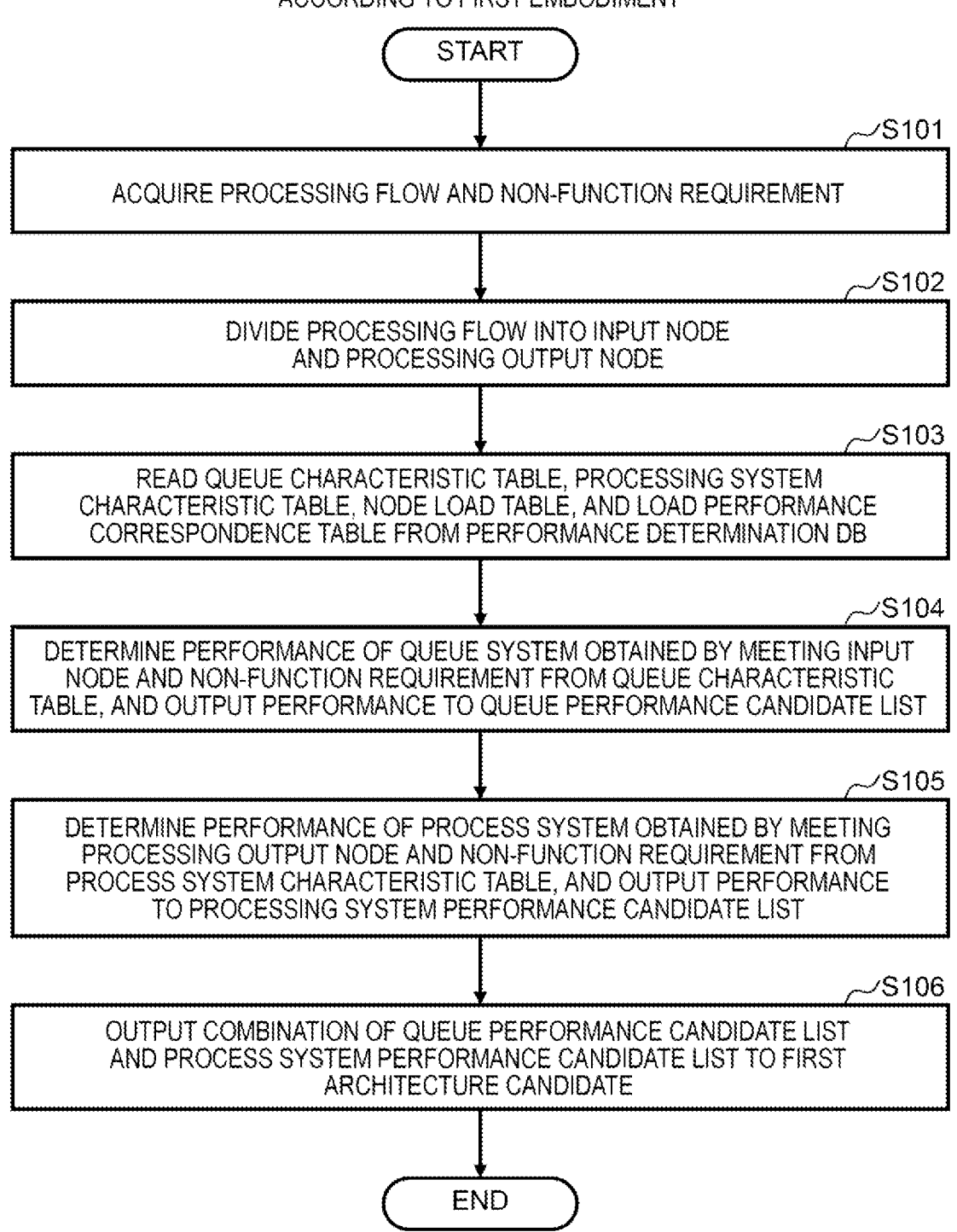

ARCHITECTURE CANDIDATE GENERATION PROCESS
ACCORDING TO FIRST EMBODIMENT

START

~S101

ACQUIRE PROCESSING FLOW AND NON-FUNCTION REQUIREMENT

~S102

DIVIDE PROCESSING FLOW INTO INPUT NODE
AND PROCESSING OUTPUT NODE

~S103

READ QUEUE CHARACTERISTIC TABLE, PROCESSING SYSTEM
CHARACTERISTIC TABLE, NODE LOAD TABLE, AND LOAD PERFORMANCE
CORRESPONDENCE TABLE FROM PERFORMANCE DETERMINATION DB

~S104

DETERMINE PERFORMANCE OF QUEUE SYSTEM OBTAINED BY MEETING INPUT
NODE AND NON-FUNCTION REQUIREMENT FROM QUEUE CHARACTERISTIC
TABLE, AND OUTPUT PERFORMANCE TO QUEUE PERFORMANCE CANDIDATE LIST

~S105

DETERMINE PERFORMANCE OF PROCESS SYSTEM OBTAINED BY MEETING
PROCESSING OUTPUT NODE AND NON-FUNCTION REQUIREMENT FROM
PROCESS SYSTEM CHARACTERISTIC TABLE, AND OUTPUT PERFORMANCE
TO PROCESSING SYSTEM PERFORMANCE CANDIDATE LIST

~S106

OUTPUT COMBINATION OF QUEUE PERFORMANCE CANDIDATE LIST
AND PROCESS SYSTEM PERFORMANCE CANDIDATE LIST TO FIRST
ARCHITECTURE CANDIDATE

END

*FIG. 6*

QUEUE CHARACTERISTIC TABLE 110

| QUEUE | PERFORMANCE VALUE | DISPERSI -BILITY | MANAGED | EVERY-SECOND INPUT RECEPTION PER SHARD | OUTPUT PER SHARD | NUMBER OF CONNECTIONS | PRICE CALCULATION FORMULA | CLOUD SERVICE |
|---|---|---|---|---|---|---|---|---|
| Kinesis | Shard | ○ | ○ | (Shard) * 1 MB | (Shard) * 2MB | (Shard) * 5 | (shard)* (RETENTION TIME)* (UNIT COST) | AWS |
| S3 | - | - | ○ | - | - | - | (CAPACITY)* (UNIT COST) | AWS |
| MSK | Shard | ○ | △ | (Shard) * 1 MB | (Shard) * 1 MB | (Shard) * 10 | (shard)* (RETENTION TIME)* (UNIT COST) | AWS |
| Kafka | Shard | ○ | × | (Shard) * 1 MB | (Shard) * 1 MB | (Shard) * 10 | (shard)* (OPERATION TIME)* (UNIT COST) | AWS |
| Event Hubs | Shard | ○ | × | (Shard) * 1 MB | (Shard) * 1 MB | (Shard) * 5 | (shard)* (RETENTION TIME)* (UNIT COST) | Azure |

NON-FUNCTION REQUIREMENT

104

| NON-FUNCTION REQUIREMENT | VALUE | PRIORITY REQUIREMENT |
|---|---|---|
| INPUT THROUGHPUT | 3 MB /s | |
| ADMINISTRATION | MANAGED | |
| SCALABILITY | YES, ON-DEMAND | |
| CLOUD | AWS | |
| PRICE RANGE | LOWEST | O |

FIG. 8

QUEUE PERFORMANCE CANDIDATE LIST    116

| NUMBER | QUEUE | PERFORMANCE VALUE |
|---|---|---|
| 1 | Kinesis | Provisioned, shard:3 |
| 2 | S3 | Standard |
| 3 | Kinesis | On Demand |
| 4 | Kinesis | Provisioned, shard:3 |
| 5 | Kinesis | Provisioned, shard:4 |
| 6 | Kafka | Shard 3 |

*FIG. 9*

PROCESS SYSTEM CHARACTERISTIC TABLE

111

| PROCESS SYSTEM | PERFORMANCE VALUE | SCALABILITY | UNITS OF MEMORIES | UNITS OF VCPUS | DESIRABLE LANGUAGE | MAXIMUM NUMBER OF SCALES | PRICE CALCULATION FORMULA | CLOUD SERVICE |
|---|---|---|---|---|---|---|---|---|
| Lambda | Memory | O | (Memory) * 256 MB | (Memory) * 1 GHz | Python/ Ruby/ JS/ C# | 1000 | (NUMBER OF CALLS)* (PROCESSING TIME)* (UNIT COST) | AWS |
| Glue | Unit | O | (Unit) * 1 GB | (Unit) * 2 GHz | Python | Ondemand | (NUMBER OF CALLS)* (PROCESSING TIME)* (UNIT COST) | AWS |
| Logstash | - | × | 256 MB | 1 GHz | Ruby | 1 | (NUMBER OF CALLS)* (PROCESSING TIME)* (UNIT COST) | AWS / Azure |
| Azure Functions | Unit | O | (Unit) * 256 MB | (Unit) * 1 GHz | Python | 1000 | (NUMBER OF CALLS)* (PROCESSING TIME)* (UNIT COST) | Azure |

PROCESSING DESCRIPTION OF PROCESSING OUTPUT NODE

```
var object = input();
object = base64(oject);
object = dataFilter(oject);

output(object);
```

NODE LOAD TABLE

113

| NODE FUNCTION | LOAD |
|---|---|
| FILTER CONVERSION | 1 |
| base64 CONVERSION | 3 |
| FIELD OPERATION | 1 |
| DATA COUPLING | 10 |
| DATA REFERENCE | 5 |

FIG. 12

LOAD PERFORMANCE CORRESPONDENCE TABLE 114

501

| PROCESSING LOAD | Lambda | Glue | Logstash | Azure Functions |
|---|---|---|---|---|
| 10 | 512(RAM) | 1 | 512 | 512 |
| 20 | 1024(RAM) | 1 | 1024 | 1024 |
| 50 | 2GB(RAM) | 2 | 2 GB | 2 GB |

FIG. 13

PROCESS SYSTEM PERFORMANCE CANDIDATE LIST 117

| NUMBER | PROCESS SYSTEM | PERFORMANCE VALUE | PROCESS SYSTEM PERFORMANCE |
|---|---|---|---|
| 1 | Glue | 1 Units | 3 Units, batch 1000 |
| 2 | Lambda | 512 MB | 100 records/1s, |

FIG. 14

FIRST ARCHITECTURE CANDIDATE LIST

119

| NUMBER | QUEUE | QUEUE PERFORMANCE | PROCESS SYSTEM | PERFORMANCE VALUE | PROCESS SYSTEM PERFORMANCE |
|---|---|---|---|---|---|
| 1 | Kinesis | Provisioned, shard:3 | Glue | 1 Units | 1 Units, batch 1000 |
| 2 | S3 | Standard | Lambda | 512 MB | 100 records/1s, |
| 3 | Kinesis | On Demand | Lambda | 512 MB | 100 records/1s, |
| 4 | Kinesis | Provisioned, shard:3 | Lambda | 512 MB | 100 records/1s, |
| 5 | Kinesis | Provisioned, shard:4 | Lambda | 512 MB | 200 records/1s, |
| 6 | Kafka | Shard 3 | EC2 | - | - |

*FIG. 16*

OPERATION SYSTEM CONFIGURATION TABLE

118

701

702

| FLOW NUMBER | QUEUE | CONFIGURATION | QUEUE ID | QUEUE PERFORMANCE (Shard) | PROCESS SYSTEM | PROCESS SYSTEM PERFORMANCE | PROCESS SYSTEM ID | CLOUD |
|---|---|---|---|---|---|---|---|---|
| 1 | Kinesis | Provisioned | K00000001 | 3 | Lambda | 300 records/1s | L0000001 | AWS |
| 2 | Kinesis | Provisioned | K00000001 | 2 | Lambda | 200 records/1s | L0000002 | AWS |
| 3 | S3 | - | S00000001 | - | Lambda | 50 records/1s | L0000003 | AWS |
| 4 | Lambda | On demand | S00000002 | 3 | Lambda | 300 records/1s | L0000004 | AWS |

FIG. 17

RESTRICTION TABLE                                    112

| NUMBER | QUEUE | RESTRICTION |
|--------|-------|-------------|
| 1 | Kinesis | NUMBER OF PROCESS SYSTEMS < Shard*5 |
| 2 | Kinesis | PERFORMANCE IMPROVEMENT THRESHOLD : 1 |
| 3 | S3 | THROUGHPUT AMOUNT PER SECOND < 10M |
| 4 | S3 | PERFORMANCE IMPROVEMENT THRESHOLD : NO |
| 5 | Kafka | NUMBER OF PROCESS SYSTEMS < Shard*3 |
| 6 | Kafka | PERFORMANCE IMPROVEMENT THRESHOLD : 0 |

FIG. 18

SECOND ARCHITECTURE CANDIDATE LIST 1501        1502                                                120

| NUMBER | SHARING FLOW NUMBER | PERFORMANCE IMPROVEMENT VALUE | QUEUE | QUEUE PERFORMANCE | PROCESS SYSTEM | PROCESS SYSTEM PERFORMANCE |
|--------|------|------|-------|------|------|------|
| 1 | 1 | 1 | Kinesis | Provisioned, shard:3 | Glue | 3 Units, batch 1000 |
| 2 | - | - | S3 | Standard | Lambda | 100 records/1s, |
| 3 | 2 | - | Kinesis | On Demand | Lambda | 100 records/1s, |
| 4 | 1 | 1 | Kinesis | Provisioned, shard:3 | Lambda | 100 records/1s, |
| 5 | 3 | 2 | Kinesis | Provisioned, shard:4 | Lambda | 200 records/1s, |
| 6 | - | - | Kafka | Shard 3 | Lambda | 100 records/1s, |

*FIG. 20*

OPERATION SYSTEM NON-FUNCTION REQUIREMENT TABLE

115

601

| FLOW NUMBER | THROUGHPUT | ADMINISTRATION | PRICE COST | SCALABILITY | CLOUD |
|---|---|---|---|---|---|
| 1 | 1 MB/s | full managed | | ○ | AWS |
| 2 | 2 MB/s | full managed | | ○ | AWS |
| 3 | 10 MB/s | full managed | | × | AWS |
| 4 | 1 MB/s | full managed | | ○ | AWS |

FIG. 21

ARCHITECTURE EVALUATION TABLE

2100

| NUMBER | QUEUE | QUEUE PERFORMANCE | PROCESS SYSTEM | PROCESS SYSTEM PERFORMANCE | SHARING FLOW | PERFORMANCE IMPROVEMENT VALUE | THROUGHPUT | ADMINIST -RATION | SCALABILITY | PRICE RANGE | OVERALL EVALUATION |
|---|---|---|---|---|---|---|---|---|---|---|---|
| 1 | Kinesis | Provisioned, shard:3 | Glue | 3 Units, batch 1000 | 1 | shard:1 | O | O | O | 1300 $ ~ | O |
| 2 | S3 | Standard | Lambda | 100 records/1s. | 2 | - | O | O | x | 100 $ ~ | x |
| 3 | Kinesis | Ondemand | Lambda | 100 records/1s. | - | - | O | O | O | 1000 $ ~ | O |
| 4 | Kinesis | Provisioned, shard:3 | Lambda | 100 records/1s. | - | - | O | O | O | 500 $ ~ | O |
| 5 | Kinesis | Provisioned, shard:4 | Lambda | 200 records/1s. | - | - | O | O | O | 1200 $ ~ | O |
| 6 | Kafka | Shard 3 | Lambda | 100 records/1s. | - | - | O | x | x | 200 $ ~ | x |

ARCHITECTURE DEPLOYMENT TABLE

2200

2201

| FLOW NUMBER | QUEUE | CONFIGURATION | QUEUE (Shard) PERFORMANCE | QUEUE ID | PROCESS SYSTEM | PROCESS SYSTEM PERFORMANCE | PROCESS SYSTEM ID | CLOUD |
|---|---|---|---|---|---|---|---|---|
| 1 | Kinesis | Provisioned | 3 | K00000001 | Lambda | 300 records/1s | L0000001 | AWS |
| 2 | Kinesis | Provisioned | 2 | K00000001 | Lambda | 200 records/1s | L0000002 | AWS |
| 3 | S3 | - | - | S00000001 | Lambda | 50 records/1s | L0000003 | AWS |
| 4 | Lambda | On demand | 3 | S00000002 | Lambda | 300 records/1s | L0000004 | AWS |

SUPPORT SYSTEM AND DESIGN SUPPORT METHOD

BACKGROUND OF THE INVENTION

1. Field of the Invention

The present invention relates to a design support system and a design support method for a cloud deployment system.

2. Description of Related Art

In recent years, with advance in cloud computing techniques, various processing functions such as collection, processing, storing, and visualization of data have been provided as software as a service (Saas) from cloud vendors. The cloud services and systems configured by combinations of the cloud services can flexibly change performance without being constrained by hardware resource limitations. Architecture designers of IT systems select processing function services based on requirements from SaaS on clouds in accordance with schemes for constructing process systems based on requirements under hardware resources limited in the related art and have transformed development schemes in accordance with schemes for designing combinations with the performance.

On the other hand, to design architectures that meet non-function requirements in which cost, manageability, and the like are required, it is necessary to select an optimum candidate from a plurality of architecture candidates. In particular, since many cloud services operate on usage-based charging, an improvement in performance of processing function services and an increase in all resources lead to an increase in usage fees.

For example, JP2016-110325A discloses, as a design scheme of architectures meeting non-function requirements on a cloud, "a system design support apparatus including: a storage device that stores a first table in which design information of past designed systems is associated with requirements for implementing the design information and a second table in which use fitness of combinations of the design information included in the first table is ranked for management based on achievements of the use of the combinations; and a calculation device that specifies design information for implementing each of a plurality of requirements related to new design target systems in the first table of the storage device, specifies design information which is a combination with a higher fitness rank from the plurality of pieces of design information in fitness ranks of combination use of the plurality of pieces of design information and design information specified for other requirements among the plurality of requirements with reference to the second table of the storage device when the plurality of pieces of design information are specified for several requirements as a specifying result, and outputs the design information specified in association with the plurality of requirements to a predetermined apparatus."

However, in the above-described technique of the related art, a situation in which other systems have already been deployed on a cloud and are operating is not assumed. When a new system is further deployed on a cloud on which existing systems have been deployed, there is a case in which a cost of the entire cloud is reduced, stability is improved, and administration is easy by sharing resources such as queues, databases, and processing units between the existing systems and new systems.

Accordingly, in evaluation of non-function requirements, it is necessary to perform the evaluation, including candidates in the case of sharing of resources and candidates in the case of non-sharing of the resources. In the technique of the related art, however, it is difficult to perform the evaluation, including candidates in the case of sharing of the resources. Therefore, there is a problem that it is difficult to efficiently find candidates for system architectures having high sufficiency of the non-function requirements.

SUMMARY OF THE INVENTION

The present invention has been devised in view of the foregoing circumstances and an object of the present invention is to efficiently find candidates of system architectures having high sufficiency of non-function requirements with regard to architecture design of a cloud deployment system.

According to an aspect of the present invention, to solve the foregoing problems, a design support system supports design of an architecture when a new system having a processing flow formed by multi-stage nodes is deployed on a cloud. The design support system includes: a storage unit; a memory; and a processor cooperating with the memory. The storage unit stores operation system configuration information indicating resources of the cloud used by an operation system which is operating on the cloud, operation system non-function requirement information indicating a non-function requirement which is met by the operation system, and restriction information indicating a restriction on performance of the resources. The processor accepts an input of a first architecture candidate indicating a combination of the resources used when the new system is deployed and operates on the cloud and new non-function requirements indicating non-function requirements which are met by an architecture of the new system, determines whether the first architecture candidate includes the resource which is likely to be shared with the operation system, determines whether the restriction related to the resource is met when the new system and the operation system share the resource which is included in the first architecture candidate and is likely to be shared with the operation system, adds the first architecture candidate including specific information of the resource shared between the new system and the operation system to a second architecture candidate when the restriction is met, adds the first architecture candidate to the second architecture candidate when the new system and the operation system do not share the resource, evaluates whether the second architecture candidate meets the non-function requirement and the new non-function requirement, and determines the second architecture candidate meeting the non-function requirement and the new non-function requirement as the architecture of the new system deployed on the cloud.

According to the present invention, by including candidates in the case of sharing of the resources in evaluation targets of the non-function requirements, it is possible to efficiently find candidates for system architectures having high sufficiency of non-function requirements compared with a case in which only candidates in the case of non-sharing of the resources are evaluated.

BRIEF DESCRIPTION OF THE DRAWINGS

FIG. 5 is a flowchart illustrating an example of a first architecture candidate generation process according to the first embodiment;

FIG. 6 is a diagram illustrating an example of a queue characteristic table that a performance determination DB has according to the first embodiment;

FIG. 7 is a diagram illustrating an example of a non-function requirement input by the designer on the design support screen according to the first embodiment;

FIG. 8 is a diagram illustrating an example of a queue performance candidate list indicating candidates of performance of queues deployed in an architecture candidate generation unit according to the first embodiment;

FIG. 9 is a diagram illustrating an example of a process system characteristic table that the performance determination DB has according to the first embodiment;

FIG. 10 is a diagram illustrating an example in which a processing output node is converted into a processing description to determine a processing load in the architecture candidate generation unit according to the first embodiment;

FIG. 11 is a diagram illustrating an example of a node load table that a performance determination DB has according to the first embodiment;

FIG. 12 is a diagram illustrating an example of a load performance correspondence table that the performance determination DB has according to the first embodiment;

FIG. 13 is a diagram illustrating an example of a process system performance candidate list in which performance of process systems deployed in the architecture candidate generation unit is enumerated as candidates according to the first embodiment;

FIG. 14 is a diagram illustrating an example in which an architecture deployed in the architecture candidate generation unit is enumerated as a first architecture candidate list according to the first embodiment;

FIG. 16 is a diagram illustrating an example of an operation system configuration table used when an evaluation deployment unit executes evaluation according to the first embodiment;

FIG. 17 is a diagram illustrating an example of a restriction table that the performance determination DB has according to the first embodiment;

FIG. 18 is a diagram illustrating an example in which architecture candidates in which a resource sharing candidate generation unit considers resource sharing are enumerated as a second architecture candidate list according to the first embodiment;

FIG. 20 is a diagram illustrating an example of an operation system non-function requirement table that the performance determination DB has according to the first embodiment;

FIG. 21 is a diagram illustrating an architecture evaluation table indicating results obtained by evaluating architectures based on non-function requirements input by the designer in the evaluation deployment unit according to the first embodiment;

FIG. 22 is an architecture deployment table illustrating results obtained when the design support system deploys architectures according to the first embodiment.

DESCRIPTION OF EMBODIMENTS

Figure 1:
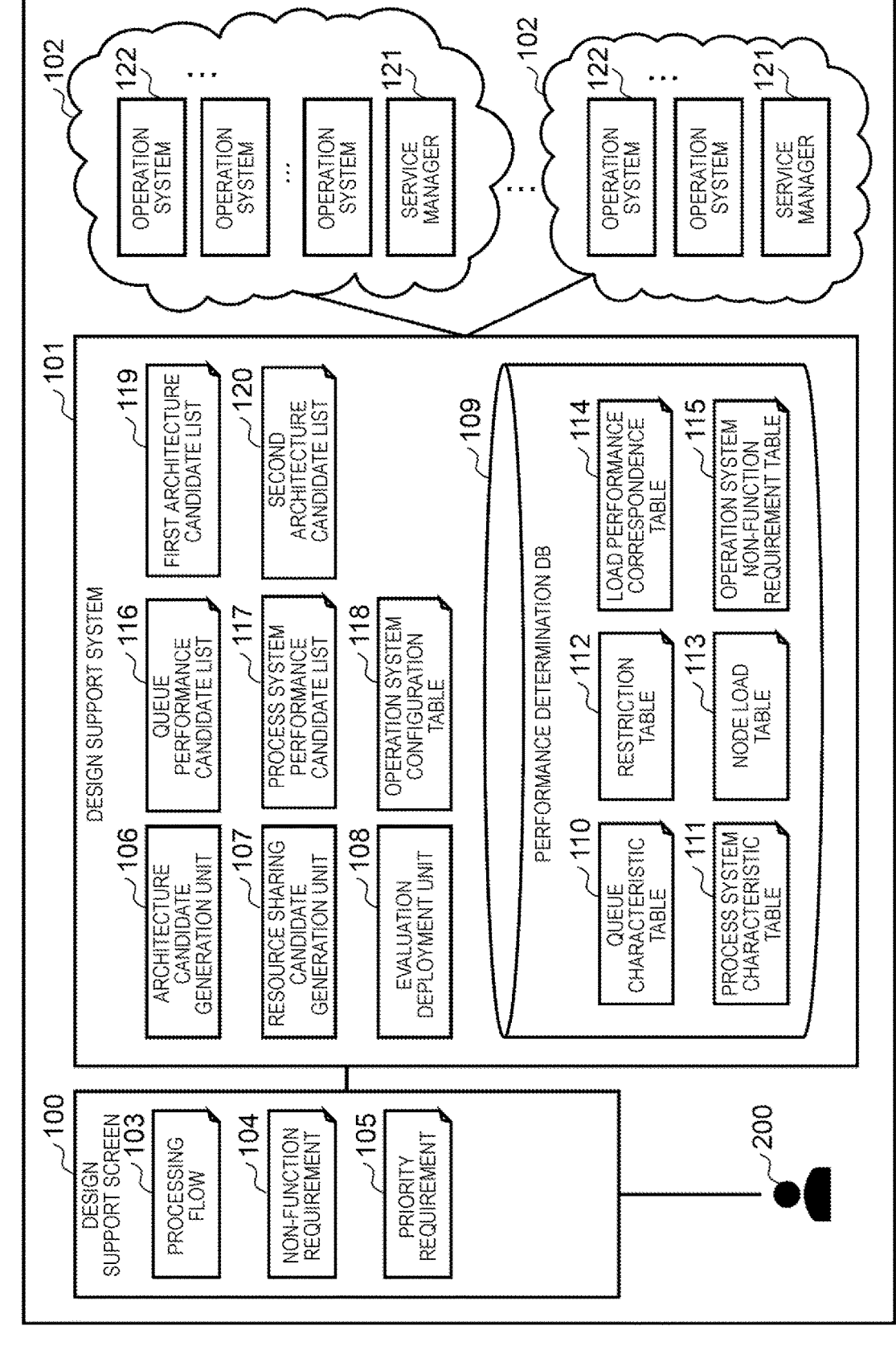
FIG. 1 is a diagram illustrating a relation between a design support system, and a design support screen and a related cloud system according to a first embodiment.

Hereinafter, an embodiment of the present disclosure will be described with reference to the drawings. The embodiment is exemplified to describe the present specification including the drawings. In the embodiment, appropriate omissions and simplifications are made to clarify the description. The number of constituents may be singular or plural unless particularly mentioned unless specifically limited. Combination forms of certain embodiments and other embodiments are included in embodiments of the present specification.

In the following description, the same reference numerals are given to the same or similar constituents. In the following embodiments and examples, description of the constituents will be omitted and differences will be mainly described in some cases. When the number of same or similar constituents is plural, different subscripts may be given to the same reference numerals for description. When it is not necessary to distinguish the plurality of constituents from each other, subscriptions may be omitted. The number of constituents may be singular or plural unless otherwise mentioned.

In the following description, various types of information will be described in forms of tables, but various types of information may be expressed with data structures other than tables. A "XX table" can be called "XX information" since the "XX" table does not depend on a data structure. Expressions of "numbers" are used as information for identifying records of various types of information, but "numbers," "identification information," "identifier," "names," "IDs", and the like can be interchanged.

In the following description, a process executed by a program will be described in some cases. In a computer, a processor (for example, a central processing unit (CPU) or a graphics processing unit (GPU)) executes a process determined by a program while using a memory or the like of a main storage device. Therefore, an entity of a process executed by executing a program may be a processor. When the processor executes the program, a functional unit that executes a process is implemented.

Similarly, an entity of a process executed by executing a program may be a controller, an apparatus, a system, a computer, or a node including a processor. An entity of a process executed by executing a program may include a dedicated circuit that executes a specific process as long as the entity is a calculation unit. The dedicated circuit is, for example, a field programmable gate array (FPGA), an application specific integrated circuit (ASIC), or the like.

In the following description, a program may be installed from a program source to a computer. The program source may be, for example, a program distribution server or a computer-readable non-transitory medium. When the program source is the program distribution server, the program distribution server includes a processor and a storage resource (storage) that stores a program to be distributed, the processor of the program distribution server may distribute the program to be distributed to another computer. In the embodiment, two or more programs may be implemented as one program or one program may be implemented as two or more programs.

AWS, Azure, Java, JavaScropt, mKinesis, S3, MSK, Kafka, Event Hubs, Lambda, Glue, EC2, Logstash indicated in the embodiment and the drawings to be described below are registered trademarks.

First Embodiment

A first embodiment is a form in which Internet of things (IoT) data such as senor or environment information generated in real time is accepted as an input and is deployed on a cloud of a system that executes a streaming process. Therefore, in the embodiment, a processing flow that the system has is separated into process systems and each system element of a queue to generate architecture candidates. However, a solution according to the present invention is not limited to a system of a streaming process and can be broadly applied to a system that has a processing flow formed by multi-stage nodes.

<System Configuration>

(Design Support System 101 According to First Embodiment)

FIG. 1 is a diagram illustrating a relation between a design support system 101, and a design support screen 100 and a related cloud environment (cloud system) 102 according to a first embodiment. The design support system 101 according to the embodiment designs an architecture of a the system when architecture is deployed in the cloud environment 102 based on information input from the design support screen 100 and deploys the designed architecture of the system in the cloud environment 102.

The design support screen 100 is displayed on a terminal connected to the design support system 101 and supports design of a new system by a designer 200. The system designed through the design support screen 100 is output as a processing flow 103, a non-function requirement 104, and a priority requirement 105.

The design support system 101 includes a performance determination DB 109, an architecture candidate generation unit 106, a resource sharing candidate generation unit 107, and an evaluation deployment unit 108. The design support system 101 includes a queue performance candidate list 116, a process system performance candidate list 117, an operation system configuration table 118, a first architecture candidate list 119, and a second architecture candidate list 120 as intermediate generation lists of a process.

The performance determination DB 109 is a database (DB) that stores a table used in a process by each processing unit. The architecture candidate generation unit 106 uses a queue characteristic table 110, a process system characteristic table 111, a node load table 113, and a load performance correspondence table 114. The resource sharing candidate generation unit 107 uses a restriction table 112. The evaluation deployment unit 108 uses an operation system nonfunction requirement table 115. The evaluation deployment unit 108 has a function of selecting an architecture meeting a non-function requirement and deploying the architecture in the cloud environment 102.

It is assumed that the cloud environment 102 may be provided on a cloud connected to the design support system 101 via a network and an operation system 122 is operating inside. The plurality of cloud environments 102 can also be provided. The plurality of cloud environments 102 may be cloud environments provided by the same vendor or may be cloud environments provided by different vendors. In each cloud environment 102, there is a service manager 121 to provide a function of receiving a state confirmation command or the like transmitted from the design support system 101 and responding to a present situation of the operation system 122.

(Hardware of Design Support System 101 According to First Embodiment)

Figure 2:
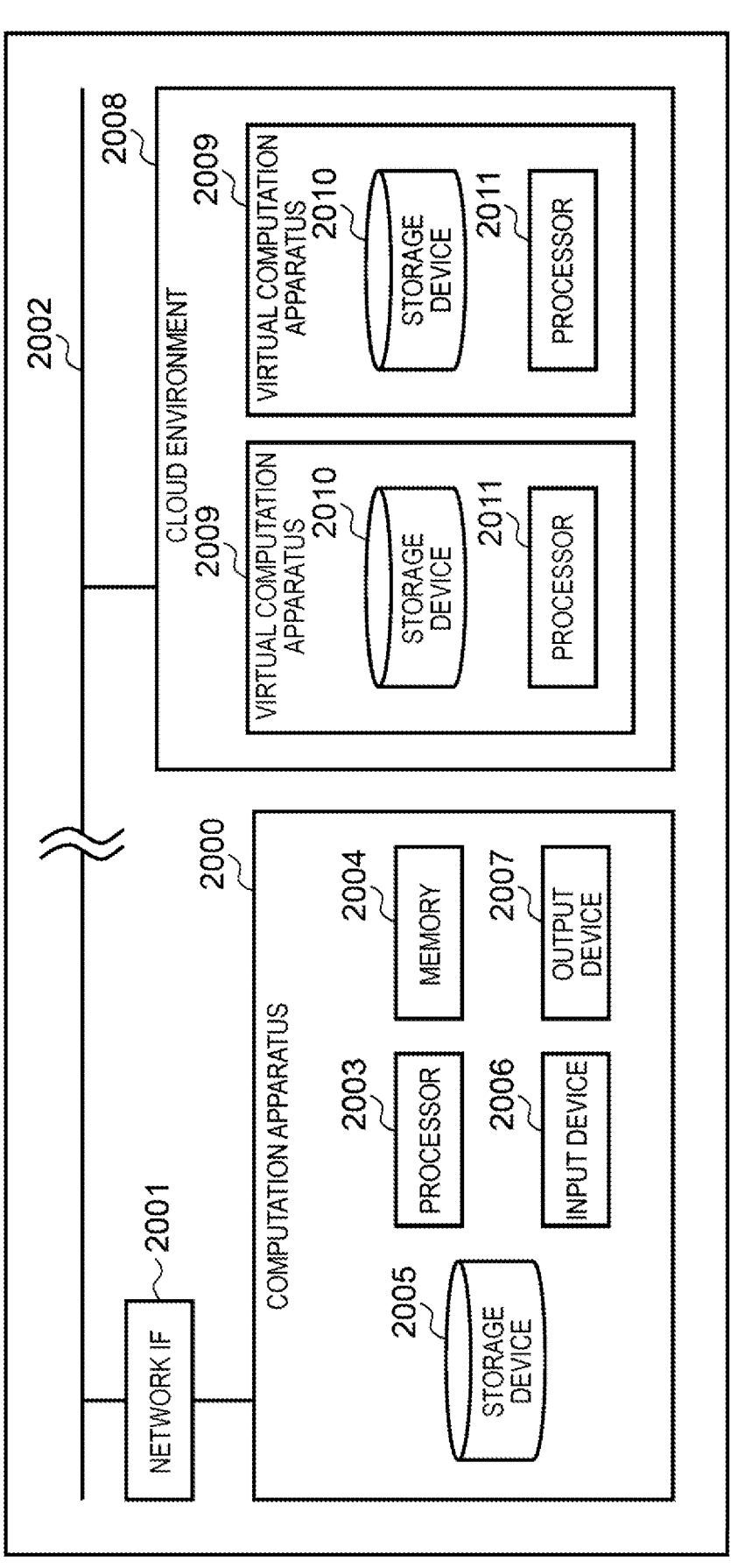
FIG. 2 is a diagram illustrating an example of hardware of the design support system according to the first embodiment.

FIG. 2 is a diagram illustrating an example of hardware of the design support system 101 according to the first embodiment. The design support screen 100 and the design support system 101 operate on a computation apparatus 2000. The computation apparatus 2000 is a computer that includes a processor 2003, a memory 2004, and a storage device 2005. A mouse, a keyboard, or the like can be connected as an input device 2006 to the computation apparatus 2000. A display device or the like can be connected as an output device 2007 to the computation apparatus 2000. The designer 200 can operate the design support screen 100 using the input device 2006 and the output device 2007.

The computation apparatus 2000 can be connected to a cloud environment 2008 through a network interface (IF) 2001 via the Internet 2002. On the cloud environment 2008, a plurality of virtual computation apparatuses 2009 are deployed. The operation system 122 operates using the processor 2011 and the storage device 2010 on the virtual computation apparatus 2009. At this time, the operation system 122 may have a form in the plurality of virtual computation apparatuses 2009 cooperate with each other to operate.

<Design of Architecture and Cloud Deployment Process>

Hereinafter, a processing procedure until the designer 200 inputs information to the design support screen 100 and an architecture is deployed will be described.

(Design Support Screen 100 According to First Embodiment)

Figure 3:
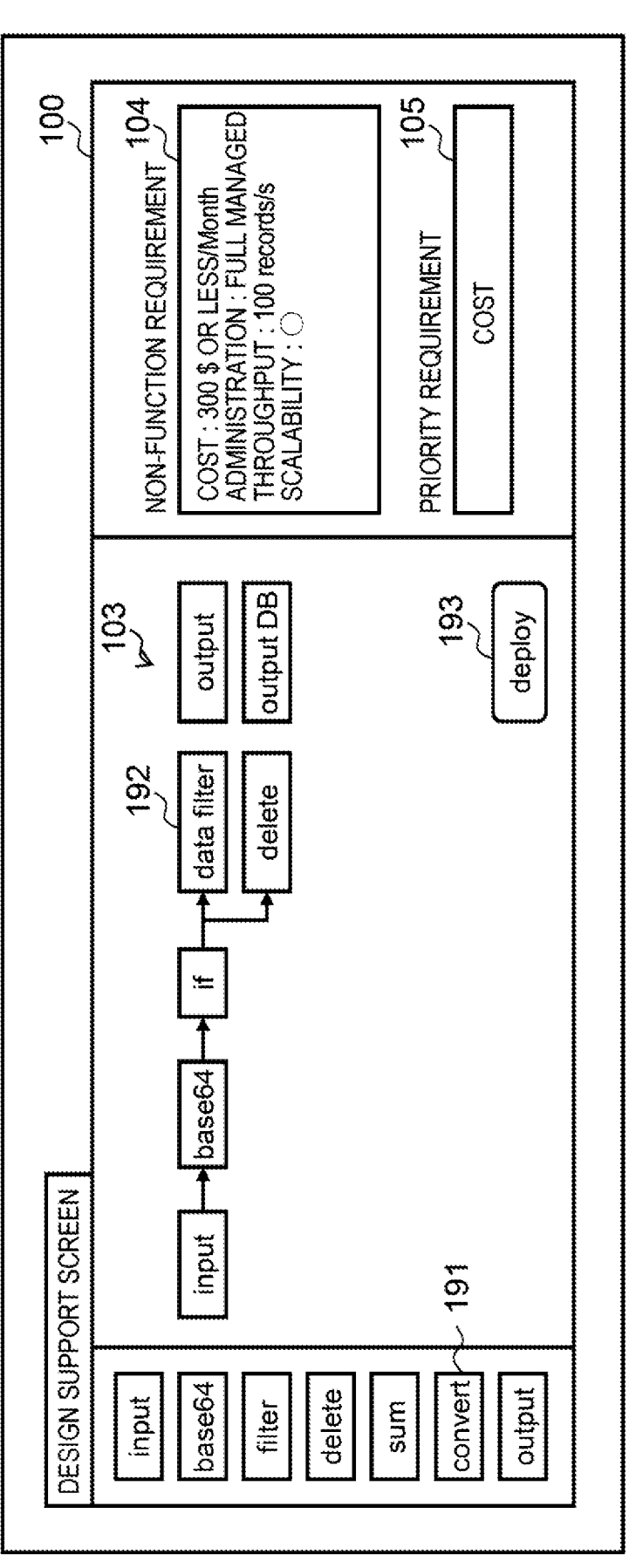
FIG. 3 is a diagram illustrating an example of a design support screen according to the first embodiment.
Figure 4:
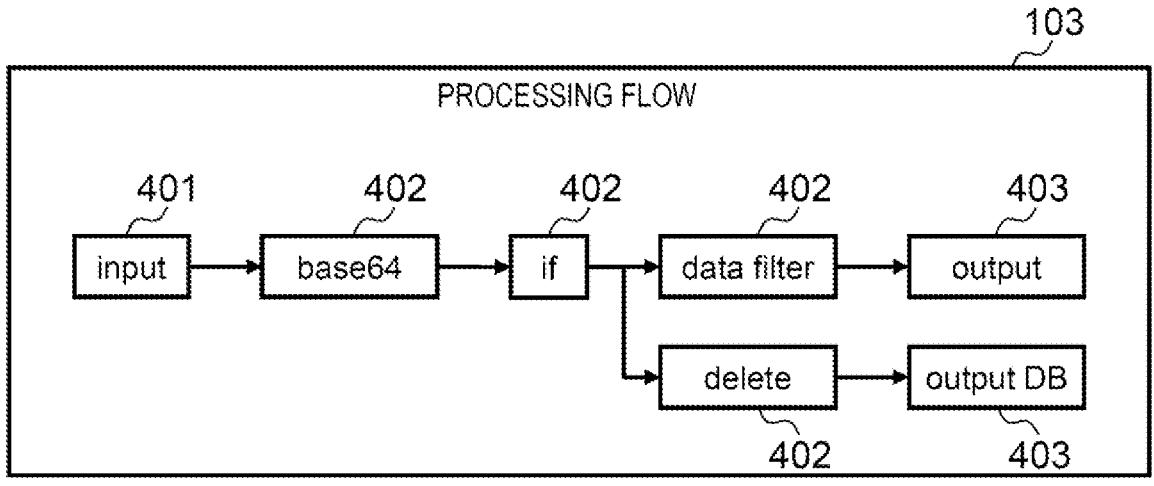
FIG. 4 is a diagram illustrating an example of a processing flow that a designer inputs on the design support screen according to the first embodiment.

FIG. 3 is a diagram illustrating an example of the design support screen 100 according to the first embodiment. FIG. 4 is a diagram illustrating an example of a processing flow 103 that the designer 200 inputs on the design support screen 100 according to the first embodiment.

The design support screen 100 is a screen on which the designer designs the processing flow 103, the non-function requirement 104, and the priority requirement 105. The design support screen 100 is provided in a flow base programing environment. In the flow base programming, a programming environment in which a process system can be designed in a no-code manner by connecting processing modules called nodes 192 by edges is provided. The designer 200 can design the processing flow 103 by selecting and deploying the nodes 192 executing processes desired to be mounted from a node group prepared in a display region 191.

In the embodiment, as illustrated in FIG. 4, in the multistage nodes 192 implementing a streaming process, there is a category of an input node 401, a processing node 402, and an output node 403. There is a restriction that nodes are connected in an order of the input node 401, the processing node 402, and the output node 403. The processing node 402 and the output node 403 are collectively referred to as a processing output node.

In the input node 401, a port number, a format, and the like for inputting a record are designated. In the processing node 402, a process of processing a record is designated as a streaming process. In the output node 403, an output designation of DB information or the like to which the processed record is output is designated.

The non-function requirement 104 is an input field in which the designer 200 can input a non-function requirement in addition to the processing flow. As the non-function requirement 104, a usage fee, an administration method, scalability, and the like of a cloud at the time of mounting of the processing flow can be designated. For example, in an input example of the non-function requirement 104 illustrated in FIG. 3, an architecture in which a cost is 300 $ or less per month, an administration service which is full managed is used, 100 records per second can be received, and scaling occurs in accordance with a load is designated as a requirement.

The designer 200 can additionally designate an item prioritized in the non-function requirement 104 as the priority requirement 105. When the design support system 101 selects a plurality of candidates, an architecture most appropriate for the priority requirement 105 is adopted. The above-described processing flow, the non-function requirement 104, and the priority requirement 105 are output to the design support system 101 when the designer 200 presses a deployment button 193.

An input scheme of the requirement according to the embodiment is not limited to the flow base programming environment and may be a code technology or another no-code input.

<First Architecture Candidate Generation Process According to First Embodiment>

FIG. 5 is a flowchart illustrating an example of a first architecture candidate generation process according to the first embodiment. The first architecture candidate generation process according to the first embodiment is executed by the architecture candidate generation unit 106 of the design support system 101.

(Step S101)

The architecture candidate generation unit 106 receives the processing flow and the non-function requirement described in a format such as JavaScript Object Notation (JSON) from the design support screen 100.

Step S102

The architecture candidate generation unit 106 divides internal node information into an input node and a processing output node with regard to the processing flow data received in step S101. This is because, in deployment of the streaming process, the input node is utilized to determine performance of a queue system and the processing output node is utilized to determine performance of a process system. When the processing flow is given, an input, processing, or output parameter is given to each node. Therefore, the processing flow is divided into the input node and the processing output node uniquely.

(Step S103)

The architecture candidate generation unit 106 reads the queue characteristic table 110, the process system characteristic table 111, the node load table 113, and the load performance correspondence table 114 from the performance determination DB 109.

(Step S104)

The architecture candidate generation unit 106 determines performance of a queue from the queue characteristic table 110 based on information regarding the input node divided in step S102 and the non-function requirement 104 received from the design support screen 100 and outputs the performance of the queue to the queue performance candidate list 116. The non-function requirement 104 indicates a non-function requirement that an architecture of a system newly deployed in the cloud environment 102 meets.

Here, the queue characteristic table 110 will be described. FIG. 6 is a diagram illustrating an example of the queue characteristic table 110 that a performance determination DB 109 has according to the first embodiment. In the queue characteristic table 110, queue systems provided as cloud services or open source software (OSS) and characteristics are enumerated. In the queue characteristic table 110, characteristics including performance values of queues are stored in association with the queues.

As shown in a row 201, the queue characteristic table 110 describes an administration method of each service, dispersibility or throughput, a restriction on service utilization, a cost, and a vendor. Here, a variable is used for record in a numerical value changed in accordance with performance such as throughput. For example, in every second reception column per Shard in a column 203, a value differs depending on the number of Shards owned by the queue system. A variable which can be changed by the designer in determination of the queue system can be designated with a performance value shown in a column 204. A non-function requirement item may be added in accordance with another cloud environment or a restriction of a system to be deployed.

FIG. 7 is a diagram illustrating an example of a non-function requirement input by the designer 200 on the design support screen 100 according to the first embodiment. The non-function requirement 104 indicates that, as requirements, an input throughput is 3 MB/s or more, administration is full managed, a system is scaled with scalability on demand in accordance with a load. Further, the non-function requirement 104 indicates that, as requirements, a cloud is AWS and a price is lowest among candidates.

For example, when an available queue is determined from the queue characteristic table 110 based on the non-function requirement of the non-function requirement 104, Kinesis in the row 201 in which the column of the managed is o and S3 in the row 202 become selection candidates as queues. In the case of Kinesis in the row 201, Shard can be designated as a performance value of the column 204 and an input of throughput 3 MB/s is obtained in the input non-function requirement. In the case of Kinesis in the row 201, the number of Shards is 3 since a throughput of (Shard)*1 MB per second can be implemented from the column 203. The queue system and the performance value proposed as candidates are output to the queue performance candidate list 116 illustrated in FIG. 8. FIG. 8 is a diagram illustrating an example of the queue performance candidate list 116 indicating candidates of performance of queues deployed in an architecture candidate generation unit according to the first embodiment.

(Step S105)

The architecture candidate generation unit 106 determines a process system and performance of the process system from the process system characteristic table 111, the node load table 113, and the load performance correspondence table 114 based on the non-function requirement and the information regarding the processing output node divided in step S101.

FIG. 9 is a diagram illustrating an example of the process system characteristic table 111 that the performance determination DB 109 has according to the first embodiment. In the process system characteristic table 111, process system candidates in charge of data processing in the streaming process are enumerated in rows. In each column, characteristics of scalability or a memory, performance of vCPU, the number of scales, and an application destination cloud environment are recorded. An item may be added in accordance with another cloud environment or restriction of a system to be deployed. In the process system characteristic table 111, characteristics including a performance value of a process system are stored in association with the process system.

The architecture candidate generation unit 106 selects appropriate process system candidates from the process system characteristic table 111 based on the input non-function requirement. For example, when scalability is necessary as the non-function requirement and AWS is designated as a cloud environment, rows 301 and 302 in the process system characteristic table become candidates. As in the queue characteristic table 110, a process of determining a performance value in a candidate is also executed using the information regarding the processing output node, the node load table 113, and the load performance correspondence table 114. In the process system characteristic table 111, a performance value of each process system is determined from a processing load of the processing output node since the performance value is a memory or a processing unit.

FIG. 10 is a diagram illustrating an example in which a processing output node is converted into a processing description to determine a processing load in the architecture candidate generation unit according to the first embodiment.

A node 900 is described in the Java Script language. After input function, a base64 function, or a dataFilter function is applied to an object variable, an output function is executed. The object variable indicates record information input in the streaming process and is processed with the base64 function or the dataFilter function. These functions are designated as nodes on the design support screen 100 by the designer.

FIG. 11 is a diagram illustrating an example of the node load table 113 that a performance determination DB 109B has according to the first embodiment. FIG. 12 is a diagram illustrating an example of the load performance correspondence table 114 that the performance determination DB has according to the first embodiment. FIG. 13 is a diagram illustrating an example of the process system performance candidate list 117 in which performance of process systems deployed in the architecture candidate generation unit 106 is enumerated as candidates according to the first embodiment.

The node load table 113 is information for calculating a processing load of all the processing output nodes based on a processing load of each function configuring the processing output node. In other words, in the node load table 113, loads are stored in association with functions when a processing load of the processing output node is added to loads related to processes of the functions configuring the processing output node in calculation.

For example, the base64 function is a load of 3 and the dataFilter function which is a function of a field operation system is a load of 1. The loads of all the functions in the processing code are added from the node load table 113 and a sum value is compared in the load performance correspondence table 114 illustrated in FIG. 12.

The load performance correspondence table 114 is a table in which a performance value required by each process system is associated with a sum value of a load. In the load performance correspondence table 114, the performance value required for a process of a processing load by the process system is stored in association with the processing load. For example, when a load is 5, it can be understood from a column 501 that a performance value is 512 MB when the process system is Lambda, and performance value is 1 when the process system is Glue, with reference to the row of the load of 10. A process system candidate and a performance value determined here are output to the process system performance candidate list 117 illustrated in FIG. 13. (Step S106)

Figure 15:
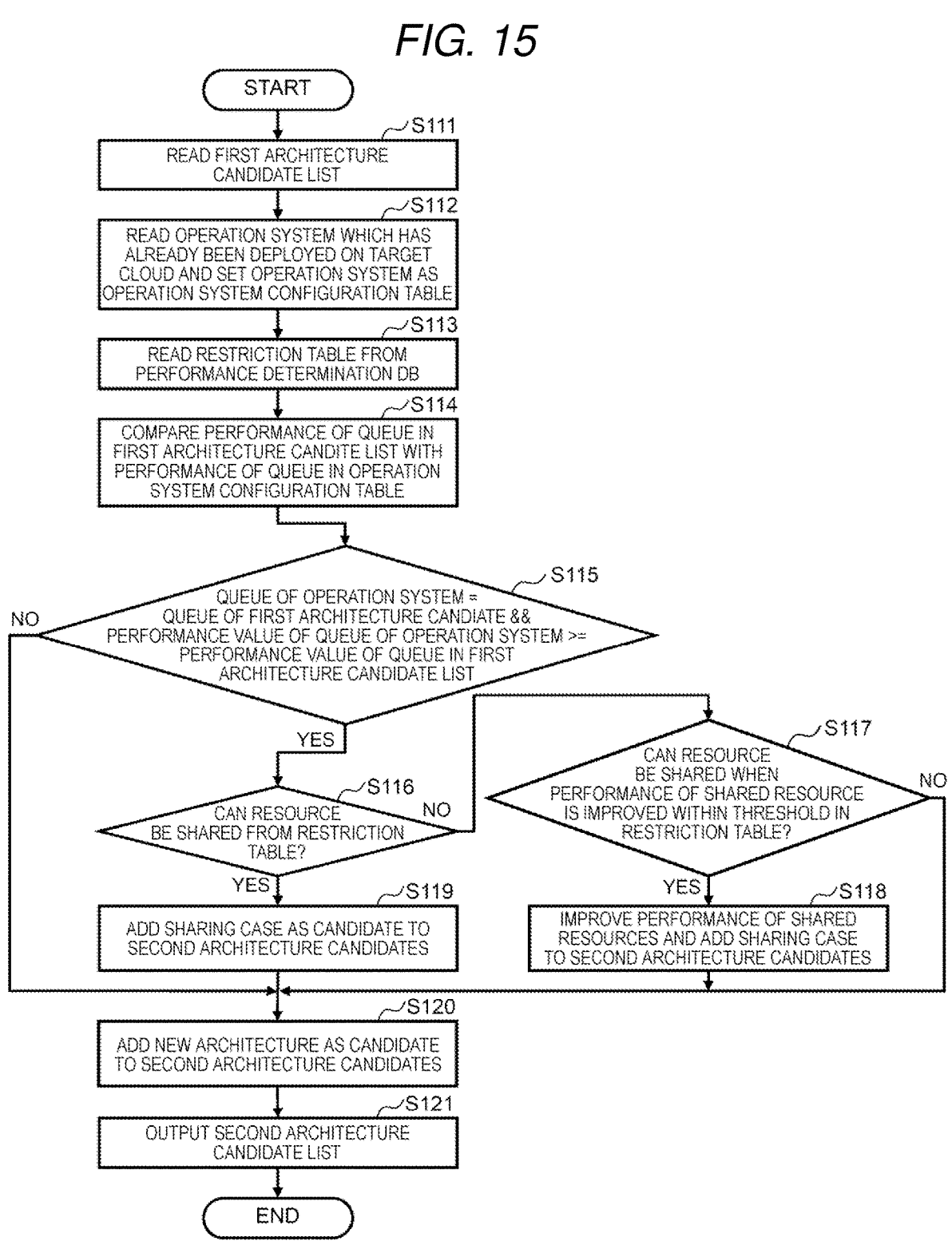
FIG. 15 is a flowchart illustrating an example of a resource sharing candidate generation process according to the first embodiment.

The architecture candidate generation unit 106 combines the queue performance candidate list 116 and the process system performance candidate list 117 output in steps S104 and S105 and sets the combination as the first architecture candidate list 119 illustrated in FIG. 15. FIG. 14 is a diagram illustrating an example in which an architecture deployed in the architecture candidate generation unit 106 is enumerated as the first architecture candidate list 119 according to the first embodiment. In the embodiment, the streaming process is exemplary. Therefore, a combination of one selected queue system candidate and one selected process system candidate in each list is set as one architecture candidate. The first architecture candidate list 119 indicates a combination of resources used when a newly deployed system is deployed and operates on the cloud environment 102.

(Resource Sharing Candidate Generation Process According to First Embodiment)

FIG. 15 is a flowchart illustrating an example of a resource sharing candidate generation process according to the first embodiment. The resource sharing candidate generation unit 107 accepts the first architecture candidate list 119, the operation system configuration table 118, and the restriction table 112 as an input. The resource sharing candidate generation unit 107 outputs architecture candidates including cases in which new systems and existing systems share resources as the second architecture candidate list 120.

(Step S111)

The resource sharing candidate generation unit 107 reads the first architecture candidate list 119 output from the architecture candidate generation unit 106.

(Step S112)

The resource sharing candidate generation unit 107 acquires information regarding the operation system 122 which is operating and has already been deployed on the cloud environment 102 to which the design support system 101 is connected. The operation system 122 acquired at this time may be an operation system that can be accessed from the design support system 101 and may not be necessarily deployed by the design support system 101 according to the embodiment. The information regarding the operation system 122 is acquired with a command or the like output to the service manager 121 on the cloud. The information regarding the operation system 122 is output as the operation system configuration table 118.

FIG. 16 is a diagram illustrating an example of the operation system configuration table 118 used when the evaluation deployment unit 108 executes evaluation according to the first embodiment. In the operation system configuration table 118, an inner system configured as each operation system 122 and performance of the system are enumerated. In other word, in the operation system configuration table 118, resources used by the inner system included in the operation system 122 and performance of the resources are listed. In the embodiment, the operation system which is design support of the streaming process also includes a queue system and a process system.

(Step S113)

The resource sharing candidate generation unit 107 reads the restriction table 112 of the performance determination DB 109. FIG. 17 is a diagram illustrating an example of the restriction table 112 that the performance determination DB 109 has according to the first embodiment. In the restriction table 112, conditions required to be met at restriction levels for each system are recorded when resources are determined in a subsequent step. The restriction table 112 indicates restrictions on performance of the resources used by the inner system included in the operation system 122. A performance improvement threshold may be set as a restriction of each system. The performance improvement threshold is a threshold indicating a limit when performance of a corresponding resource is improved in step S117 and is a design factor determined in accordance with the performance of each resource or the cloud environment 102.

(Step S114)

The resource sharing candidate generation unit 107 compares performance of a queue of a candidate in the first architecture candidate list 119 with performance of queue in the operation system configuration table 118 in order.

The resource sharing candidate generation unit 107 executes steps S115 to S120 on all candidates (hereinafter, referred to as architecture candidates).

(Step S115)

The resource sharing candidate generation unit 107 determines whether the queue system of the architecture candidate matches the queue system of the operation system 122. When the queue system of the architecture candidate matches the queue system of the operation system 122, the resource sharing candidate generation unit 107 determines whether the performance of the queue of the operation system 122 is equal to or greater than the performance of the queue of the architecture candidate. This is because surplus performance of the queue of the operation system 122 can be likely to be utilized as the queue of the architecture candidate when the performance of the queue of the operation system 122 is superior to the performance of the queue of the architecture candidate. The resource sharing candidate generation unit 107 moves to step S116 when the match is made for the condition (YES in step S115), and moves to step S120 when the match is not made (NO in step S115).

In step S115, in other words, it is determined whether the first architecture candidate includes a resource that is likely to be shared with the operation system 122.

(Step S116)

Based on the restriction table 112 read in step S113, the resource sharing candidate generation unit 107 determines whether the architecture candidate and the operation system 122 can share the resources. For example, in the queue Kinesis shown in the first row of the restriction table 112 illustrated in FIG. 17, there is a restriction of the number of process systems <Shard*5. That is, when the queue of the operation system is Kinesis and the number of Shards is 3, the number of process systems connected to the queue is required to be less than 15. When the queues of the operation system 122 and the architecture candidates are shared, the process systems of the architecture candidates are connected to the queues. When a total connection number is less than 15 at this time, it is determined that the resources can be shared. Other restrictions include a throughput amount and a data type. The resource sharing candidate generation unit 107 moves to step S119 when the match is made for each restriction condition (YES in step S116), and moves to step S117 when the match is not made (NO in step S116).

(Step S117)

When the performance improvement threshold is set in a target queue in the restriction table 112 in the process of step S116, the resource sharing candidate generation unit 107 determines whether the resource can be shared with the architecture candidate when the performance value of the queue of the operation system is improved by the performance improvement threshold. For example, when there is the operation system 122 indicated in a row 701 in the operation system configuration table 118 and fourteen process systems have already been connected to the queue, the architecture candidates are the number of process systems <Shard*5 in the first row of the restriction table 112. Therefore, resource sharing is currently not possible.

Here, the performance improvement threshold is 1. Therefore, when performance of the queue of the operation system in the row 701 is changed from 3 to 4, the number of connectable process systems is less than 20 and the resources can be shared with the architecture candidates. When it is determined that the performance is improved within the performance improvement threshold and the resources can be shared (YES in step S117), the resource sharing candidate generation unit 107 moves to step S118. When the match is not made for the restriction in the restriction table despite the improvement in the performance with the performance improvement threshold (NO in step S117), the resource sharing candidate generation unit 107 moves to step S120.

(Step S118)

The resource sharing candidate generation unit 107 improves the performance of the queue of the operation system 122 and adds a case in which the resources are shared with the architecture candidate to second architecture candidates. The resource sharing candidate generation unit 107 moves the process to step S120 when step S118 ends.

(Step S119)

The resource sharing candidate generation unit 107 adds a case in which the resources can be shared with the architecture candidates as they are for the queue of the operation system 122 to the second architecture candidates. The resource sharing candidate generation unit 107 moves the process to step S120 when step S119 ends.

(Step S120)

The resource sharing candidate generation unit 107 adds a case in which the resources of the architecture candidates are not shared with the operation system 122 to the second architecture candidates.

(Step S121)

The resource sharing candidate generation unit 107 collects each candidate added as the second architecture candidate and outputs each candidate as the second architecture candidate list 120. FIG. 18 is a diagram illustrating an example in which architecture candidates in which the resource sharing candidate generation unit 107 considers resource sharing are enumerated as the second architecture candidate list 120 according to the first embodiment. In FIG. 18, the architecture candidate of the case in which the resources of the architecture candidates are not shared with the operation system 122 and which is added in step S120 are not illustrated.

In the embodiment, it is determined whether the queue can be shared for the streaming process. However, when the process system other than the streaming process is deployed, sharable database or memory resources or performance of calculation processing resources may be compared.

(Evaluation Deployment Process According to First Embodiment)

Figure 19:
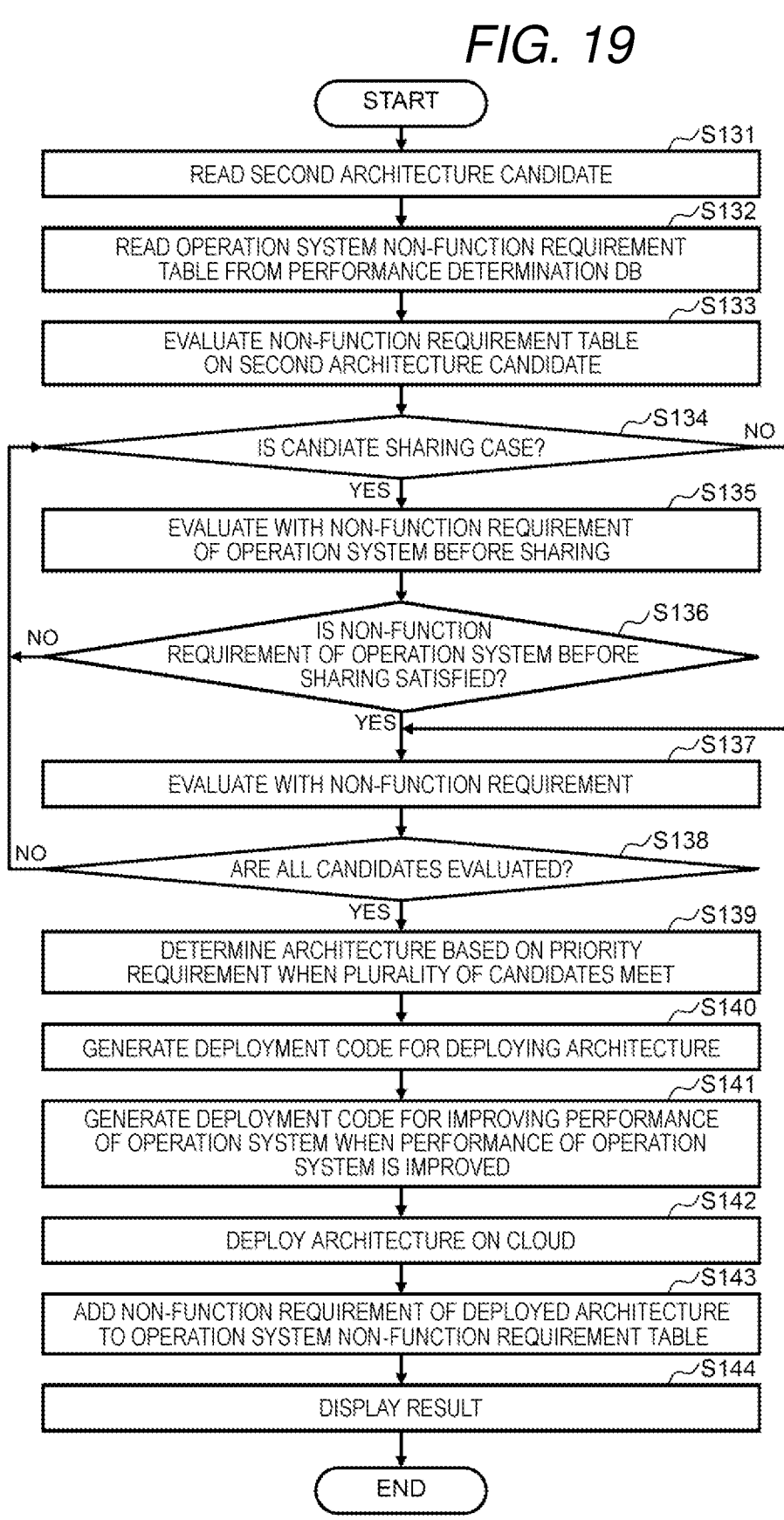
FIG. 19 is a flowchart illustrating an example of an evaluation deployment process according to the first embodiment.

FIG. 19 is a flowchart illustrating an example of an evaluation deployment process according to the first embodiment. The evaluation deployment unit 108 accepts the second architecture candidate list 120 and the operation system non-function requirement table 115 as an input, proposes an architecture appropriate for the non-function requirement designated by the designer as a candidate, and deploys the architecture in the cloud.

(Step S131)

The evaluation deployment unit 108 reads the second architecture candidate list 120 output from the resource sharing candidate generation unit 107.

(Step S132)

The evaluation deployment unit 108 reads the operation system non-function requirement table 115 from the performance determination DB 109.

FIG. 20 is a diagram illustrating an example of the operation system non-function requirement table 115 that the performance determination DB 109 has according to the first embodiment. In the operation system non-function requirement table 115, non-function requirement information designated when the operation system 122 is deployed is stored. The operation system non-function requirement table 115 indicates non-function requirements which are met by the operation system 122. In the operation system non-function requirement table 115, non-function requirement input by the designer are retained as they are in the case of a system deployed by the design support system 101 according to the embodiment. The operation system non-function requirement table 115 can also be newly described by the designer in the case of an operation system deployed by another system.

Further, as indicated in a row 601 of FIG. 20, an item that is obvious as information obtained from an operation system on a cloud environment can also be recorded based on a transmission result of a state confirmation command to a service manager of the cloud environment.

(Step S134)

The evaluation deployment unit 108 evaluates the non-function requirement from steps S134 to S138 on each candidate in the second architecture candidate list 120 (hereinafter referred to as an architecture candidate).

In the second architecture candidate list 120 illustrated in FIG. 18, a queue of each architecture candidate, performance of the process system, a sharing flow number, and a performance improvement value are recorded. A sharing flow number 1501 in the second architecture candidate list 120 indicates that the resources are shared with the operation system 122 of a flow number described in the operation system configuration table 118 of FIG. 16. That is, the sharing flow number 1501 is specific information for specifying a sharable resource. A performance improvement value 1502 indicates a performance value of the resource improved in the resource sharing.

The evaluation deployment unit 108 moves to step S135 when the architecture candidate shares the resource with the operation system 122 (YES in step S134), and moves to step S137 when the architecture candidate does not share the resource (NO in step S134).

(Step S135)

The evaluation deployment unit 108 executes evaluation of the non-function requirement of the target operation system 122 in the operation system non-function requirement table 115 with regard to the operation system 122 with which the architecture candidate shares the resource. In this step, there is an advantage of preventing a case in which the operation system 122 does not meet the non-function requirement as a result obtained by sharing the resource and making the improvement in the performance. The evaluation deployment unit 108 executes determination according to whether each non-function requirement item is met or not met when the non-function requirement is evaluated, and determines that the non-function requirement is met when all the non-function requirement items are met.

When the operation system meets the non-function requirement despite the sharing of the resource (YES in step S136), the evaluation deployment unit 108 moves to step S137. When the operation system does not meet the non-function requirement (NO in step S136), the evaluation deployment unit 108 returns to step S134 to evaluate a subsequent architecture candidate.

(Step S137)

The evaluation deployment unit 108 evaluates the architecture candidate with the non-function requirement input by the designer.

FIG. 21 is a diagram illustrating an architecture evaluation table 2100 indicating results obtained by evaluating architectures based on non-function requirements input by the designer in the evaluation deployment unit 108 according to the first embodiment. In the architecture evaluation table 2100, a queue 2101 and a performance improvement value 2102 are columns indicating information that architecture candidates have. In the architecture evaluation table 2100, a throughput 2103 and a price range 2104 are columns for evaluating the non-function requirement. In the evaluation, it is first determined whether each architecture candidate meets the item of the non-function requirement. A value of an item such as a price or a throughput in which a specific value can be derived is derived and then recorded. When the resources are shared, a fee used by the resource shared in calculation of a price is not summed up. Accordingly, a reduction in the fee corresponding to the sharing of the resource can be embedded in the case in which the resource is shared. When the architecture candidate meets all the non-function requirements, an intent (an overall evaluation 2105) met in the column of the overall evaluation is recorded.

(Step S138)

The evaluation deployment unit 108 moves to step S139 when the evaluation of all the architecture candidates is completed (YES in step S138).

(Step S139)

The evaluation deployment unit 108 determines a deployment architecture based on the priority requirement input by the designer from the overall evaluation 2105 of the architecture evaluation table 2100 illustrated in FIG. 21 when the plurality of architecture candidates meet the non-function requirements. For example, when a price (cost) is designated as the priority requirement 105 (FIG. 3) in the architecture evaluation table 2100 illustrated in FIG. 21, a configuration indicated in a row 2106 is selected because of the lowest price of 500 $.

(Step S140)

The evaluation deployment unit 108 generates a deployment code for deploying the architecture candidate selected in step S139 as description such as YAML. The evaluation deployment unit 108 reads a resource described in a code format. A system which is deployed on the cloud is provided from each cloud vendor.

(Step S141)

The evaluation deployment unit 108 newly generates a deployment code for improving the performance of the queue of the operation system 122 when the architecture candidate selected in step S139 improves the performance of the operation system 122. When the operation system 122 is not the operation system 122 deployed by the design support system 101 of the embodiment, the evaluation deployment unit 108 transmits a command to change the performance of the queue to the service manager 121 on the cloud environment 102. The service manager 121 corrects the performance of the corresponding queue and corrects the operation system 122 in response to the reception of the command.
(Step S142)

The evaluation deployment unit 108 deploys the architecture candidate and the corrected operation system 122 on the cloud environment based on the deployment code generated in steps S140 and S141.
(Step S143)

The evaluation deployment unit 108 adds the non-function requirement of the deployed architecture candidate to the operation system non-function requirement table 115 that the performance determination DB 109 has.
(Step S144)

The evaluation deployment unit 108 displays a deployment result on the design support screen 100. FIG. 22 is an architecture deployment table 2200 illustrating results obtained when the design support system 101 deploys architectures according to the first embodiment. In the architecture deployment table 2200, a queue ID 2201 displays a unique ID of the queue that each operation system 122 has. When the unique ID is the same, it is indicated that the queue of each operation system 122 is shared.

In the flowchart, an architecture candidate is generated from the processing flow 103 and the non-function requirement 104 input by the designer 200. The non-function requirement is evaluated, including a case in which the architecture candidate shares the resource with the operation system and a case in which the performance of the resource of the operation system is improved and then the resource is shared. Accordingly, the architecture further meeting the non-function requirement can be selected compared with a case in which the sharing of the resource is not taken into account.

The steps from steps S139 to S143 are the steps of deploying the architecture candidates selected through the evaluation as they are. An evaluation result may be displayed for the designer after all the evaluation is completed in step S138 and the designer may select the architecture which is finally deployed. In this case, the architecture evaluation table 2100 illustrated in FIG. 21 is displayed on the design support screen 100.

Advantages of First Embodiment

In the above-described first embodiment, a new system formed by multiple stages deployed in a cloud environment and an operation system which is operating in the cloud environment include architecture candidates in both cases of sharing or non-sharing of a resource such as a queue or a process system as an evaluation target of non-function requirements. An architecture meeting a non-function requirement of the new system and a non-function requirement of the operation system is determined as an architecture of the new system deployed in the cloud environment 120 among the second architecture candidates.

Accordingly, according to the first embodiment, by including an architecture candidate in both the cases of sharing or non-sharing of a resource in the evaluation targets of the non-function requirements, it is possible to efficiently find the appropriate architecture candidate of the new system meeting the non-function requirement.

In the above-described first embodiment, by improving performance of a resource and including an architecture candidate sharing the resource in the evaluation targets of the non-function requirements, it is possible to flexibly design the architecture.

In the above-described first embodiment, the combinations of the pluralities of queue systems and process systems are generated as the first architecture candidates. Accordingly, it is possible to efficiently find an architecture candidate of a new real time data process system meeting the non-function requirement from the more architecture candidates.

In the above-described first embodiment, queue systems and process systems that can meet the non-function requirements of the new system are determined from the processing flow input by the designer and the combinations of the queue systems and the process systems are generated as the first architecture candidates. Accordingly, it is possible to efficiently find an appropriate architecture candidate meeting the non-function requirement based on the processing flow.

In the above-described first embodiment, when there are the plurality of second architecture candidates meeting the non-function requirements and new non-function requirements, an architecture candidate in which the priority requirement indicates a best value is determined as an architecture of a new system deployed in the cloud environment 120. Accordingly, it is possible to find an optimum architecture in accordance with the requirement.

In the above-described first embodiment, the architecture of a new system is deployed in the cloud environment and a non-function requirement of the new system is added to the operation system non-function requirement information for storing the non-function requirement of the system that is operating. Accordingly, it is possible to reuse information regarding the resource or the non-function requirement related to a system in which an architecture is designed with the design support system at a subsequent time of system architecture design.

(Modified Example of First Embodiment)

In the first embodiment, the processing flow that the system has is divided into the process systems and each of system elements of queues to generate the architecture candidates. However, the present invention is not limited to the systems of the streaming process, but can be widely applied to a system that has a processing flow formed by multi-stage nodes.

In the modified example of the first embodiment, the performance determination DB 109 stores the characteristic information in which characteristics including the performance values of the system elements are associated with system elements included in a new system of a design target of the architecture. The system elements are, for example, units of processes such as queue systems or process systems. The characteristic information includes, for example, characteristics and performance values of the system elements such as the queue characteristic table 110 or the process system characteristic table 111.

The architecture candidate generation unit 106 accepts an input of a processing flow, divides the processing flow into n (where n≥2) nodes, and determines system elements that can meet predetermined non-function requirements and performance values of the system elements for the n nodes. The architecture candidate generation unit 106 generates the first architecture candidates by combining the determined system elements for the n nodes. In the modified example of the first embodiment, the resource sharing candidate generation unit 107 and the evaluation deployment unit 108 process the generated first architecture candidates as in the first embodiment.

In the above-described modified example of the first embodiment, by generating the combinations of the plurality of system elements as the first architecture candidates, it is possible to efficiently find an architecture candidate of a new system meeting the non-function requirement from the more architecture candidates.

Second Embodiment

Figure 23:
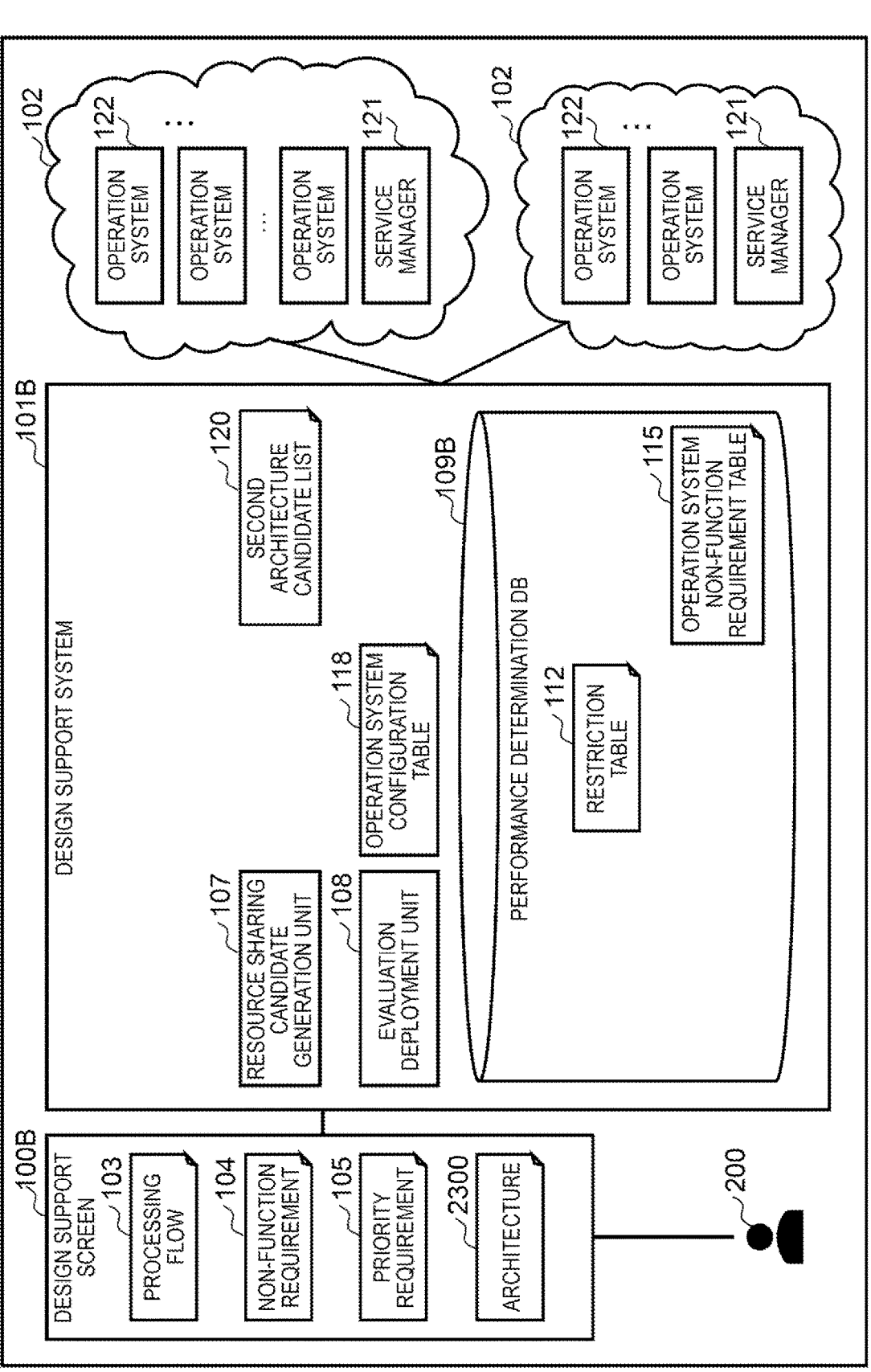
FIG. 23 is a diagram illustrating a relation between a design support system, and a design support screen and a related cloud system according to a second embodiment.

FIG. 23 is a diagram illustrating a relation between a design support system 101B, and a design support screen 100B and a related cloud environment 102 according to a second embodiment. In the embodiment, the designer 200 designs the processing flow 103, the non-function requirement 104, the priority requirement 105, and the architecture deployment table 2300 on the design support screen 100. At this time, the architecture deployment table 2300 is assumed to be design information with granularity equal to that of design information of the first architecture candidate list 119 according to the first embodiment. The designed processing flow 103, non-function requirement 104, priority requirement 105, and architecture deployment table 2300 are input to the design support system 101B.

The design support system 101B includes the resource sharing candidate generation unit 107, the evaluation deployment unit 108, the operation system configuration table 118, the second architecture candidate list 120, and the performance determination DB 109B. As in the first embodiment, the design support screen 101B is connected to the cloud environment 102.

When the architecture deployment table 2300 is input on the design support screen 100B, the resource sharing candidate generation unit 107 executes a reading process. At this time, the process is similar to a format input as one of the first architecture candidate list 119 in the architecture deployment table 2300. It is determined whether the architecture candidates described in the first architecture candidate list 119 share the resources with the operation systems 122, and the architecture candidates are output to the second architecture candidate list 120.

The evaluation deployment unit 108 is similar to that of the first embodiment. The evaluation deployment unit 108 reads the second architecture candidate list 120 and deploys an architecture most appropriate for the priority requirement 105 meeting the non-function requirement in the cloud environment 102.

(Advantages of Second Embodiment)

Even when the designer directly designs an architecture in the embodiment, the technology of the present disclosure is applied and a non-function requirement can be evaluated, including a case in which the resources are shared with the operation system 122.

The embodiment of the present disclosure has been described in detail above, but the present disclosure is not limited to the above-described embodiments and can be modified in various forms within the scope of the present invention without departing from the gist of the present invention. For example, the above-described embodiments have been described in detail to facilitate description of the present invention and are not limited to a case in which all the above-described configurations are necessarily included. Addition, deletion, and substitution of other configurations to, from and with some of the configurations can be made.

Some or all of the above-described configurations, functional units, processing units, threads, and the like may be implemented with hardware by being designed with integrated circuits or the like. The above-described configurations, functions, and the like may be implemented with software by causing a processor to interpret and execute a program for implementing each function. Information such as a program, a table, or a file implementing each function can be stored in a recording device such as a memory, a hard disk, a solid state drive (SSD) or a recording medium such as an IC card, an SD card, or a DVD.

In the above-described drawings, control lines or information lines that indicate lines are illustrated as necessary for description and may not necessarily indicate all the control lines and information lines in actual implementation. For example, most of the configurations may be considered to be actually connected to each other.

The functions and data arrangement forms of the above-described design support systems 101 and 101B, design support screens 100 and 100B, and cloud environment 102 are merely exemplary. The functions and the data arrangement forms can be changed into optimum arrangement forms from the viewpoint of performance of hardware or software, processing efficiency, communication efficiency, or the like.

What is claimed is:

1. A design support system that supports design of an architecture when a new system having a processing flow formed by multi-stage nodes is deployed on a cloud, the design support system comprising:

a storage unit;

a memory; and a processor cooperating with the memory, wherein the storage unit stores;

operation system configuration information indicating resources of the cloud used by an operation system which is operating on the cloud, operation system non-function requirement information indicating a non-function requirement which is met by the operation system, and restriction information comprising conditions required to be met at restriction levels for the new system and restrictions on performance of the resources used by an inner system of the operation system, and wherein the processor:

accepts an input of a first architecture candidate indicating a combination of the resources used when the new system is deployed and operates on the cloud and new non-function requirements indicating non-function requirements which are met by an architecture of the new system, determines whether the first architecture candidate includes the resource which is likely to be shared with the operation system, determines whether the restrictions related to the resources are met when the new system and the operation system share the resource which is included in the first architecture candidate and is likely to be shared with the operation system, adds the first architecture candidate including specific information of the resource shared between the new system and the operation system to a second architecture candidate when the restrictions are met, adds the first architecture candidate to the second architecture candidate when the new system and the operation system do not share the resource, evaluates whether the second architecture candidate meets the non-function requirement and the new non-function requirement, and determines the second architecture candidate meeting the non-function requirement and the new non-function requirement as the architecture of the new system deployed on the cloud.

2. The design support system according to claim 1, wherein the restriction information includes a threshold when performance of the resources is improved, and wherein the processor:

determines whether the restrictions related to the resources in an improvement in the performance of the resources within a range of the threshold is met when the first architecture candidate includes the resource shared with the operation system and the restrictions related to the resources is not met, and adds the first architecture candidate in which the resource with the improved performance is sharable to the second architecture candidate.

3. The design support system according to claim 1, wherein the storage unit stores characteristic information in which characteristics including performance values of system elements included in the new system are associated with the system elements, and wherein the processor:

accepts an input of the processing flow, divides the processing flow into a plurality of nodes, determines each of the system elements and performance values of each of the system elements which are able to meet the new non-function requirements with regard to the plurality of nodes, and generates a combination of a plurality of system elements as the first architecture candidate.

4. The design support system according to claim 1, wherein the processing flow includes an input node and a processing output node.

5. The design support system according to claim 4, wherein the storage unit stores;

queue characteristic information in which a characteristic including a performance value of a queue is associated with the queue, process system characteristic information in which characteristics including performance values of the processing system are associated with the processing system, node load information in which loads are stored in association with functions when a processing load of the processing output node is added to loads related to processes of the functions configuring the processing output node in calculation, and load performance correspondence information in which performance values necessary for the processes of the processing load in the process systems are associated with the processing load, and wherein the processor:

accepts an input of the processing flow, divides the processing flow into an input node and a processing output node, determines the queue and a performance value of the queue which is able to meet the new non-function requirement with regard to the input node based on the queue characteristic information, determines the process system and the performance value of the process system which is able to meet the new non-function requirement with regard to the processing output node based on the process system characteristic information, the node load information, and the load performance correspondence information, and generates a combination of the queue and the process system as the first architecture candidate.

6. The design support system according to claim 1, wherein the processor:

accepts an input of a priority requirement indicating a non-function requirement prioritized among the new non-function requirements, and determines an architecture of the new system deployed on the cloud based on the priority requirement when there are a plurality of the second architecture candidates meeting the non-function requirements and the new non-function requirements.

7. The design support system according to claim 1, wherein the processor:

deploys the second architecture candidate determined to be deployed on the cloud, on the cloud, and adds the new non-function requirement to the operation system non-function requirement information.

8. A design support method executed by a design support system that supports design of an architecture when a new system having a processing flow formed by multi-stage nodes is deployed on a cloud, wherein the design support system includes a storage unit, a memory, and a processor cooperating with the memory, wherein the storage unit stores:

operation system configuration information indicating resources of the cloud used by an operation system which is operating on the cloud, operation system non-function requirement information indicating a non-function requirement which is met by the operation system, and restriction information comprising conditions required to be met at restriction levels for the new system and restrictions on performance of the resources used by an inner system of the operation system, and wherein the processor:

accepts an input of a first architecture candidate indicating a combination of the resources used when the new system is deployed and operates on the cloud and new non-function requirements indicating non-function requirements which are met by an architecture of the new system, determines whether the first architecture candidate includes the resource which is likely to be shared with the operation system, determines whether the restrictions related to the resources are met when the new system and the operation system share the resource which is included in the first architecture candidate and is likely to be shared with the operation system, adds the first architecture candidate including specific information of the resource shared between the new system and the operation system to a second architecture candidate when the restrictions are met, adds the first architecture candidate to the second architecture candidate when the new system and the operation system do not share the resource, evaluates whether the second architecture candidate meets the non-function requirement and the new non-function requirement, and determines the second architecture candidate meeting the non-function requirement and the new non-function requirement as the architecture of the new system deployed on the cloud.

9. The design support method according to claim 8, wherein the restriction information includes a threshold when performance of the resources is improved, and wherein the processor:

determines whether the restrictions related to the resources in an improvement in the performance of the resources within a range of the threshold is met when the first architecture candidate includes the resource shared with the operation system and the restrictions related to the resources is not met, and adds the first architecture candidate in which the resource with the improved performance is sharable to the second architecture candidate.

10. The design support method according to claim 8, wherein the storage unit stores characteristic information in which characteristics including performance values of system elements included in the new system are associated with the system elements, and wherein the processor:

accepts an input of the processing flow, divides the processing flow into a plurality of nodes, determines each of the system elements and performance values of each of the system elements which are able to meet the new non-function requirements with regard to the plurality of nodes, and generates a combination of a plurality of system elements as the first architecture candidate.

11. The design support method according to claim 8, wherein the processing flow includes an input node and a processing output node.

12. The design support method according to claim 11, wherein the storage unit stores;

queue characteristic information in which a characteristic including a performance value of a queue is associated with the queue, process system characteristic information in which characteristics including performance values of the processing system are associated with the processing system, node load information in which loads are stored in association with functions when a processing load of the processing output node is added to loads related to processes of the functions configuring the processing output node in calculation, and load performance correspondence information in which performance values necessary for the processes of the processing load in the process systems are associated with the processing load, and wherein the processor:

accepts an input of the processing flow, divides the processing flow into an input node and a processing output node, determines the queue and a performance value of the queue which is able to meet the new non-function requirement with regard to the input node based on the queue characteristic information, determines the process system and the performance value of the process system which is able to meet the new non-function requirement with regard to the processing output node based on the process system characteristic information, the node load information, and the load performance correspondence information, and generates a combination of the queue and the process system as the first architecture candidate.

13. The design support method according to claim 8, wherein the processor:

accepts an input of a priority requirement indicating a non-function requirement prioritized among the new non-function requirements, and determines an architecture of the new system deployed on the cloud based on the priority requirement when there are a plurality of the second architecture candidates meeting the non-function requirements and the new non-function requirements.

14. The design support method according to claim 8, wherein the processor:

deploys the second architecture candidate determined to be deployed on the cloud, on the cloud, and adds the new non-function requirement to the operation system non-function requirement information.

15. The design support system according to claim 1, wherein the processor executes an evaluation of the non-function requirement in an operation system non-function requirement table with regard to the operation system with which the first architecture candidate the resources to prevent a case in which the operation system does not meet the non-function requirement.

16. The design support system according to claim 15, wherein the processor executes a determination according to whether the non-function requirement is met or not met during the evaluation of the non-function requirement.

17. The design support system according to claim 15, wherein the restriction information sets a performance improvement threshold for the new system indicating a limit where performance of a corresponding resource is improved and a design factor determined.

* * * * *